United States Patent [19]
Steen

[11] 3,823,343
[45] July 9, 1974

[54] COMMUTATION DIRECTING CIRCUIT FOR FAULT CURRENT LIMITING STATIC SWITCH

[75] Inventor: Floyd L. Steen, Lansdowne, Pa.

[73] Assignee: General Electric Company, Philadelphia, Pa.

[22] Filed: Sept. 29, 1970

[21] Appl. No.: 76,446

[52] U.S. Cl..................... 317/20, 317/23, 321/45 C
[51] Int. Cl........................... H02h 3/08, H02h 7/14
[58] Field of Search...... 307/252 M, 252 T; 317/20, 317/23, 31; 321/14, 45 C; 323/9, 24

[56] References Cited
UNITED STATES PATENTS
3,407,314   10/1968   Wolff............................... 317/31 X
3,558,982   1/1971   Greenwood.......................... 317/20

FOREIGN PATENTS OR APPLICATIONS
1,262,434   3/1968   Germany............................. 323/24

Primary Examiner—A. D. Pellinen
Attorney, Agent, or Firm—J. Wesley Haubner; Albert S. Richardson, Jr.

[57] ABSTRACT

Circuitry for directing commutation in an inverse parallel connected power thyristor switch including selectively operable commutation circuits for interrupting a fault current in response to a stop signal from an overcurrent detector. The directing circuitry monitors current flowing through the switch to determine its direction and enables the stop signal to actuate the commutation circuit associated with the fault current conducting thyristor.

6 Claims, 3 Drawing Figures

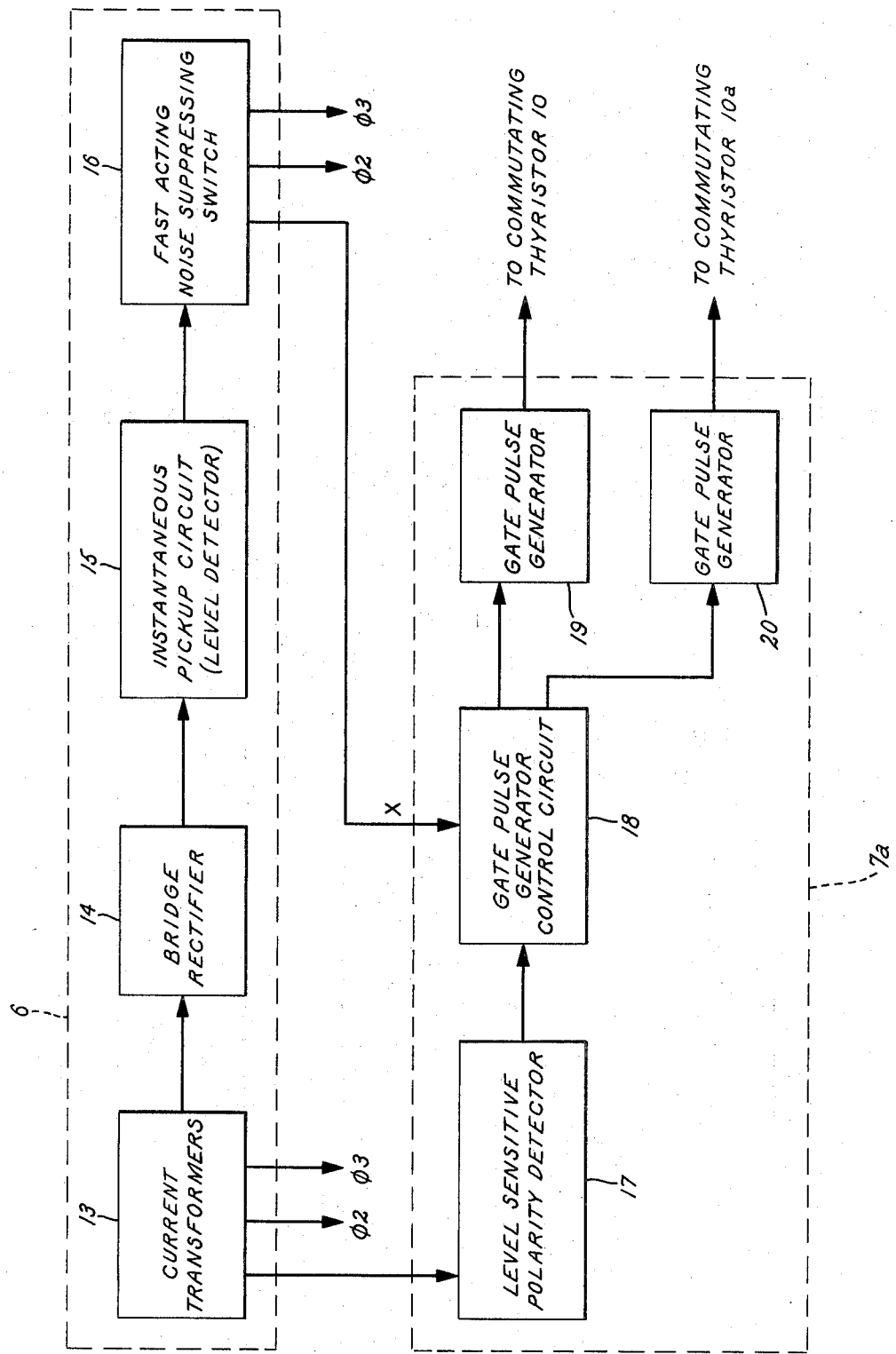

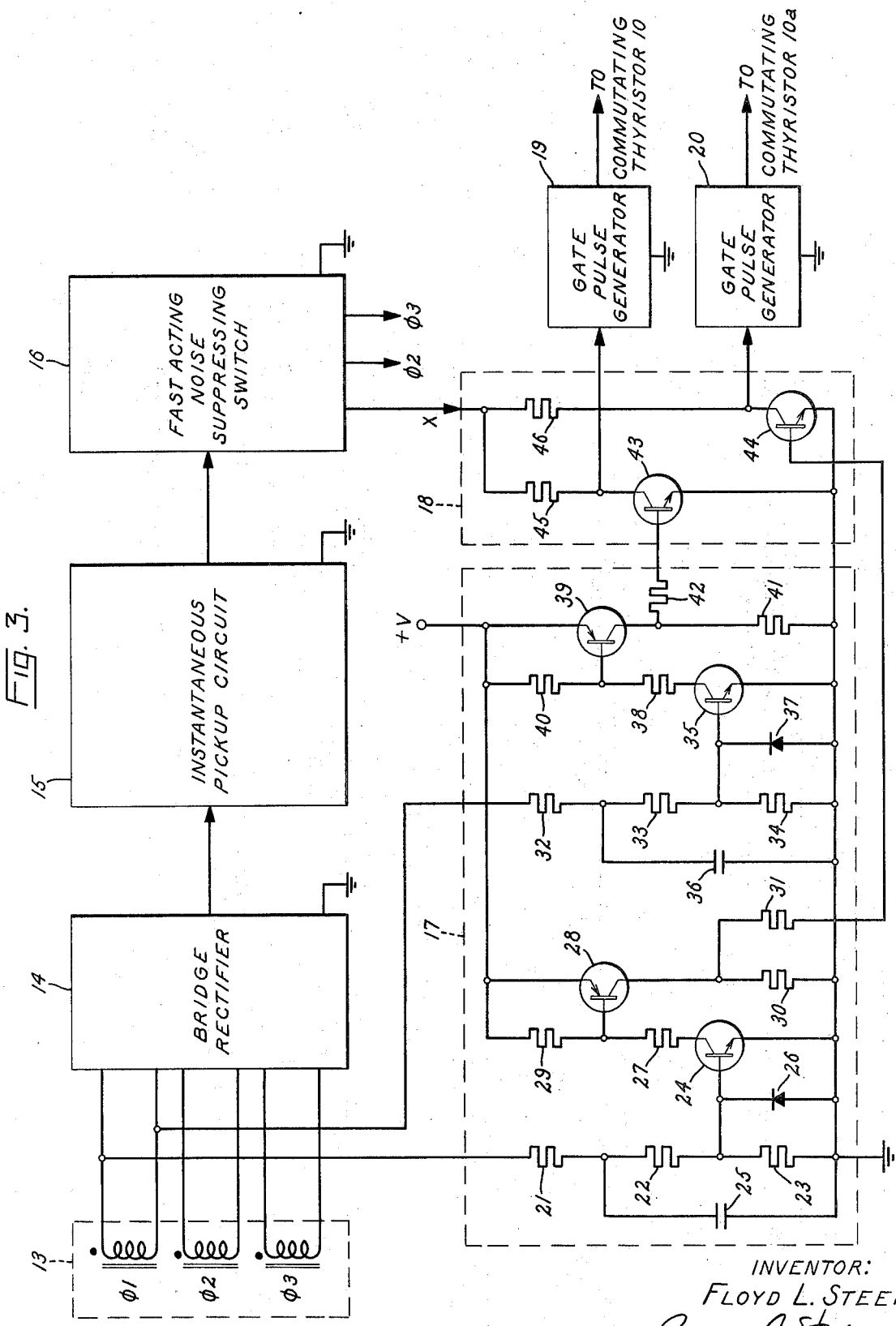

3,823,343

COMMUTATION DIRECTING CIRCUIT FOR FAULT CURRENT LIMITING STATIC SWITCH

BACKGROUND AND OBJECTS OF THE INVENTION

This invention relates to forced commutated static switches which are adapted to be connected in electric power circuits for selectively permitting or blocking the flow of alternating current therein. More particularly, this invention relates to a combination of an a.c. thyristor switch, including commutation circuits selectively operative for interrupting current through the switch in response to a sensed abnormality and novel means for controlling the commutation circuits.

In the art of electric power distribution and utilization, it is a common practice to employ switches or circuit breakers in order to initiate or terminate the flow of load current on command from a control circuit. These switches may advantageously be constructed of solid state controllable switching devices such as thyristors. A silicon controlled rectifier (SCR) is one type of thyristor useful in such switches. Since thyristor switches do not utilize any moving parts for circuit completion or interruption, they are known in the art as static switches. Static switches may be provided with overcurrent protective means to enable them to interrupt the flow of load current in response to a sensed overcurrent of a preselected magnitude.

As is well known, an SCR comprises a body of semiconductor material having a plurality of layers of alternately P and N type conductivities which form a plurality of back-to-back rectifying junctions therein. The semiconductor body is disposed between a pair of main electrodes, one known as the anode and the other as the cathode. Thyristors additionally include some form of gating means (e.g., in a conventional SCR it is the gate electrode) which is operative for initiating current conduction between the anode and cathode. When connected to a source of voltage and a load, an SCR will ordinarily block appreciable current flow between its anode and cathode until triggered or fired by a signal to its gate electrode at a time when its anode is biased positive with respect to its cathode, whereupon it abruptly switches to a relatively low resistance conductive state. Once conducting, the SCR will continue to conduct load current even if no further triggering is provided, so long as the magnitude of current is above a predetermined holding level. When the magnitude of current drops below that level, the SCR switches to a relatively high resistance state whereupon the flow of load current is blocked until the SCR is subsequently retriggered. Therefore when connected to an A.C. power source an SCR will necessarily cease conducting at the occurrence of a natural current zero.

SCR's are unidirectional controlled switches, therefore, in an A.C. power distribution system they are normally connected in an inverse parallel configuration to form the static switch in order that both the positive and negative half cycles of the source voltage can be supplied to the load. A control circuit is normally provided for supplying gate signals to the switch or power SCR's to initiate conduction therein. The control circuit may include means for effectuating load current interruption in response to a sensed overcurrent. This may be accomplished by stopping the supply of trigger signals from the control circuit, whereupon the switch or power thyristors would commence blocking load current at the occurrence of the next natural current zero. It should be noted that this manner of current interruption may allow the fault current to build up to dangerous levels before the conducting switch regains its blocking state since interruption can only occur at the current zero following the fault current's detection.

In order to provide current interruption capability within a fraction of a half cycle of the alternating source voltage, means must be provided to force the conducting power SCR off, i.e., return it to its blocking state. The process of turning off a conducting power SCR is known in the art as forced commutation or simply commutation. A static switch equipped with commutation means for interrupting load currents within a fraction of a half cycle of the detection of a fault is known as a current limiting switch. Such a switch limits the magnitude of fault current to an acceptable maximum by interrupting the fault current early in its half cycle, i.e., before it reaches its peak magnitude.

The commutating means can take a variety of forms which are well known in the art. One commonly used commutation circuit comprises a charged capacitor connected in series with a thyristor (the thyristor is known in the art as a commutating thyristor, and the capacitor is known as a commutating capacitor). This circuit is connected in shunt across the power SCR of the static switch. The commutating thyristor is poled in the same direction as the power SCR and is normally in a non-conductive state. The commutating capacitor is charged to a predetermined d.c. voltage in opposition to the polarity of the power thyristor and is isolated from the power thyristor by the non-conducting commutating thyristor. When a fault current whose magnitude exceeds a preselected level is detected flowing through the system, the commutating thyristor is triggered on by its control circuit. This allows the charged commutating capacitor to discharge in the reverse direction through the conducting power thyristor. The commutating capacitor discharge serves to reverse bias the power thyristor and drive the current flowing through it below its holding level, whereupon it turns off (resumes its blocking state).

In an a.c. static switch, comprising a pair of power SCR's connected in inverse parallel relationship with one another, a separate commutation circuit is connected in shunt across each SCR of the switch. Accordingly, the commutation circuit shunting one SCR will necessarily form a series path or loop with the commutation circuit shunting the inversely poled SCR. Since the capacitor in each commutation circuit is charged to a polarity in opposition to the SCR it shunts, if the commutation thyristors of both commutation circuits are simultaneously triggered the energy stored in the capacitor shunting the then non-conducting SCR will act to forward bias the conducting SCR while the energy stored in the other capacitor is trying to reverse bias it. The net effect of this action may impede proper commutation.

In order to minimize the forward bias effect of the discharge of the commutation capacitor shunting the nonconducting SCR when the commutation circuits are simultaneously actuated, I have previously proposed, in U.S. Pat. No. 3,558,983, to use decoupling inductors connected between each power SCR and the source end of the switch. In certain high power applications the provision of such inductors may not be entirely satisfactory as an economic means of insuring proper commutation.

Accordingly, it is a general object of the present invention to provide an improved scheme for selectively controlling the commutation circuits of an a-c static current limiting switch so that undiminished energy stored in the capacitor associated with the conducting SCR is available to reverse bias it.

Another object of my present invention is to provide a novel circuit for discriminating which thyristor of an inverse parallel connected thyristor switch is conducting and for enabling only the commutation circuit associated with that thyristor to operate when called upon to do so.

SUMMARY OF THE INVENTION

Means are provided for directing commutation in a current limiting static switch connected between an alternating voltage source and a load in a high current electric power system. The static switch comprises a pair of power thyristors connected in inverse parallel relationship. A commutation circuit including a normally non-conductive thyristor and a charged capacitor is provided in shunt across each power thyristor. The polarity of the capacitor is in opposition to the thyristor which it shunts.

Each commutation circuit has associated therewith triggering means operative for triggering the thyristor of the commutation circuit into conduction. The triggering means are adapted to operate in response to receipt of a stop signal from an overcurrent detecting circuit. The stop signal is provided by that circuit whenever the load current is detected as being above a preselected trip level.

My invention comprises polarity detecting means for monitoring the current flowing through the switch and providing signals indicative of the currents' direction to a control means. The control means is provided for directing the stop signal, from the overcurrent detecting means to the triggering means for the commutation circuit shunting the conducting power thyristor in accordance with the signals received from the polarity detecting means. The control circuit is also operative, in accordance with those signals, for preventing the stop signal from operating the other triggering means. Accordingly, commutation only results from the energy in commutation circuit shunting the conducting power thyristor. This selective action ensures successful commutation.

BRIEF DESCRIPTION OF THE DRAWINGS

This invention will be better understood and its various objects and advantages will be more fully appreciated from the following description taken in conjunction with the accompanying drawings in which:

FIG. 2 is a functional block diagram of the overcurrent detecting means and the means to control commutation in the switch.

FIG. 3 is a more detailed schematic-functional block diagram of that shown in FIG. 2.

DETAILED DESCRIPTION OF THE PREFERRED EMBODIMENT OF THE INVENTION

Figure 1:
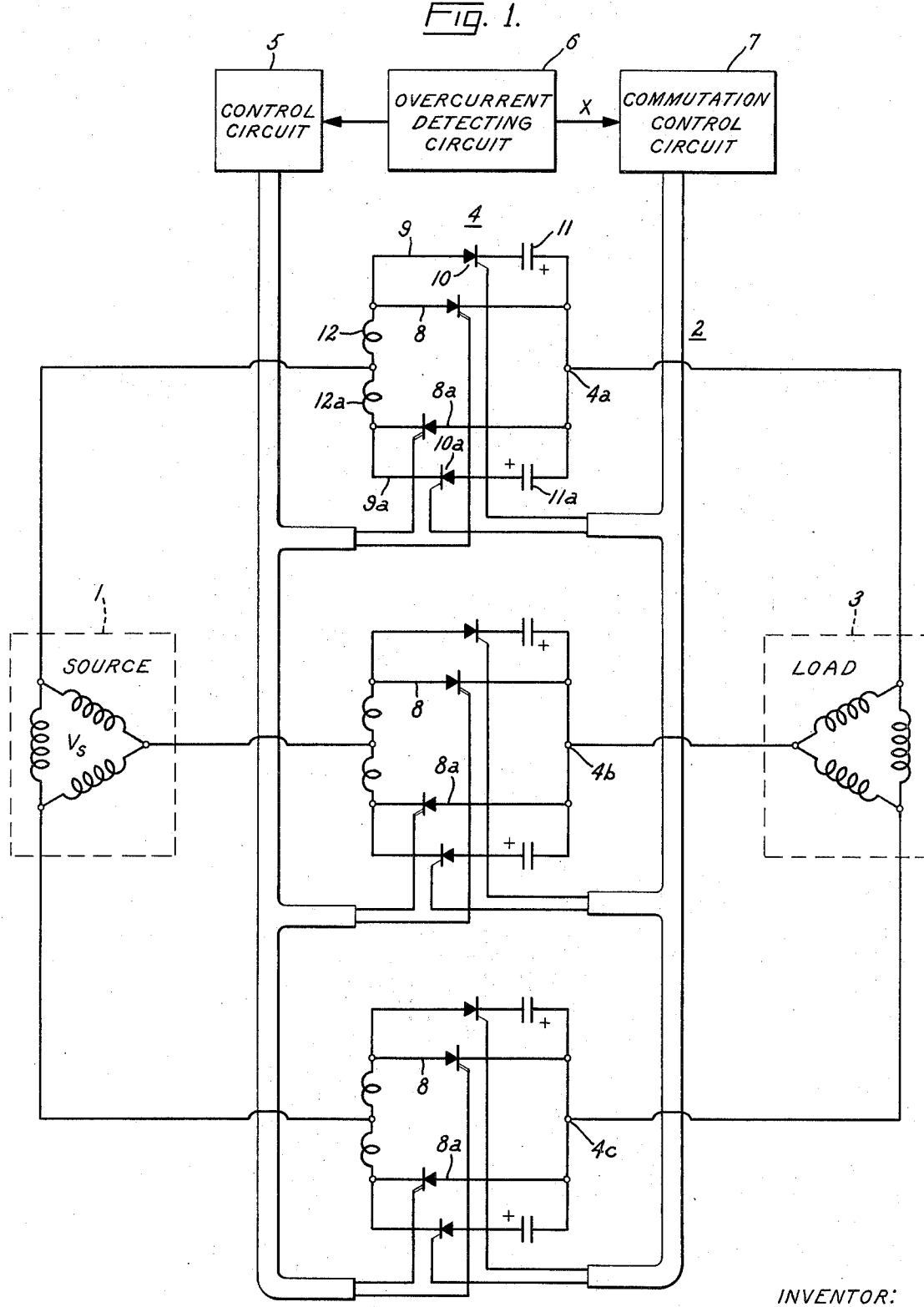
FIG. 1 is a schematic diagram of the static switch utilizing my invention.

As can be seen in the FIG. 1, a three-phase alternating voltage source 1 is arranged to supply electric power to a load 3. In order to initiate or to terminate the flow of current to the load, a static circuit breaker is provided between the source and the load. This circuit breaker is denoted as the Static System Protector 2 in that it includes a solid state or static switch 4.

In order to control conduction of the static switch, i.e., initiate or terminate current conduction therein, the Static System Protector also includes a control circuit 5 having two states or modes, namely ON and OFF. When control circuit 5 is actuated from its ON to its OFF states the static switch interrupts the flow of current to the load. Further, the Static System Protector includes commutation means to force commutate the static switch in high-speed response to detection of a fault current by overcurrent detecting circuit 6. The commutation means are controlled by commutation control circuit 7.

The static switch 4 comprises one thyristor switch for each phase of the power system, namely 4a, 4b and 4c. In order to provide for bidirectional load current conduction, each of the phase switches comprise a pair of SCR's connected in inverse parallel relationship with one another to form unidirectional conducting power legs 8 and 8a.

The power SCR's in legs 8 and 8a are shown as having a double gate electrode in order to symbolically represent that each leg may consist of a parallel array of similarly poled high-power SCR elements. The number of elements utilized in each leg depends on the desired current handling capability of the switch. Of course it is to be understood that the legs may each comprise only a single power SCR element, if such is desired. To form a higher voltage switch, additional SCR's can be respectively connected in series with those shown, if desired.

Control circuit 5, in its ON mode, provides suitable gate signals to the power SCRS making up switch 4 to render the switch conductive, whereupon load current is able to flow between the source 1 and the load 3. In its OFF mode no gate signals are provided by control circuit 5 to any of the switch power SCRS. Hence, when control circuit 5 is in this mode the static switch 4 blocks the flow of load current.

Each phase switch of the Static System Protector is equipped with means for rapidly forcing all conducting power SCRS off in response to a sensed fault in that phase. In phase one that means includes a pair of commutation circuits 9 and 9a, connected in shunt across respective SCR legs 8 and 8a. Commutation circuit 9 comprises a normally non-conductive commutating thyristor 10 and a serially connected commutating capacitor 11. Commutation circuit 9a comprises a normally non-conductive commutating thyristor 10a and a serially connected commutating capacitor 11a. Each capacitor is charged to a d.c. voltage level, the polarity of which is as shown. Although not shown in FIG. 1, a precharging scheme such as that claimed in U.S. Pat. No. 3,098,949-Goldberg is contemplated. Once charged the capacitor is available to commutate its associated power thyristor when called upon to do so. A decoupling inductor 12 is connected in series with power leg 8 while a decoupling inductor 12a is connected in series with power leg 8a to aid in commutation.

When a fault occurs, current flowing in the switch increases abnormally. When the magnitude of fault current attains a preselected level, overcurrent detecting circuit 6 is activated and immediately provides a Stop signal to the control circuit 5 and to the commutation control circuit 7. Upon receipt of a stop signal, control circuit 5 ceases producing gate signals for the power SCRS. In response to the same event, control circuit 7 is arranged to supply a gate signal to the thyristor in the commutating circuit associated with the power SCR leg conducting the fault current. Once triggered the commutating thyristor conducts whereupon its associated charged commutating capacitor begins discharging through the shunted power SCR leg in the reverse direction, i.e., cathode to anode, to quench conduction therein.

The above described sequence of events can occur within a few microseconds from the time a fault of preselected magnitude is sensed. Therefore, the fault current which is permitted to flow can be limited to an acceptable magnitude, i.e., well below the available peak fault current magnitude, by virtue of the rapid response of the Static System Protector.

A more detailed showing of the overcurrent detecting circuit and part of commutation control circuit 7 of Static System Protector is found in the functional block diagram of FIG. 2 and the schematic diagram of FIG. 3.

As can be seen from FIG. 2 overcurrent detecting circuit 6 comprises a current transformer 13 for monitoring the current flow between source 1 and load 3, a bridge rectifier 14, an instantaneous pickup circuit 15 and a fast acting noise suppressing switch 16. The function of detecting circuit 6 is to provide an output of Stop signal X whenever the instantaneous magnitude of the current in any phase of the switch 4 attains a preselected value. This value is the trip level of the circuit breaker 2 and is adjustable.

Bridge rectifier 14 serves to rectify the signal from the current transformer to provide a signal indicative of the magnitude of load current flowing through the switch. When this signal reaches the preselected trip level, pickup circuit 15 is actuated to provide a signal to the fast acting noise suppressing switch 16. This switch is adapted to filter spurious noise and to supply the Stop signal X to the commutation control circuit 7 in rapid response to the signal from the pickup circuit 15.

Commutation control circuit 7 includes an individual control circuit for controlling commutation in each phase of the switch. In FIG. 2 an individual commutation control circuit, denoted as 7a, is shown. This circuit controls commutation in phase one.

The function of circuit 7a is to determine which power leg, i.e., 8 or 8a, is conducting load current and to preclude the commutating thyristor shunting the nonconducting leg from being triggered. Thus, if a fault current above the trip level is in existence in phase one only the commutating thyristor shunting the leg conducting that current will be triggered into conduction to commutate the leg off and thereby interrupt the fault current.

Circuit 7a comprises a level sensitive polarity detector 17, a gate pulse generator control circuit 18, a gate pulse generator 19 for commutating thyristor 10 and a gate pulse generator 20 for commutating thyristor 10a.

The polarity detector 17 receives as its input an unrectified signal from the secondary of the current transformer monitoring phase 1. When the input signal is of positive polarity, i.e., the dotted end of the secondary is positive, and above a certain threshold level, the detector 17 applies signals to gate pulse generator control circuit 18. Upon receipt of these signals circuit 18 acts to disable gate pulse generator 20 (the one associated with commutating thyristor 10a) from being actuated in response to a Stop signal while enabling gate pulse generator 19 to be actuated in response to such a signal. Similarly, when the input signal is of the negative polarity, i.e., the undotted end of the secondary is positive and above the detectors' threshold level, the signals applied to circuit 18 cause it to disable generator 19 from being actuated while enabling generator 20 to be actuated in response to a Stop signal.

Whenever the current flowing through the switch 4 is below the threshold level of the polarity detector 17, the detector is unable to determine its direction and neither gate pulse generator is disabled. The threshold level of polarity detector 17 is made sufficiently low so that the decoupling inductors that are connected in series with the power legs are effective to ensure successful commutation of this amount of current even though both commutating circuits are concurrently triggered.

In a three phase switch, like that shown in FIG. 1, a fault current may flow simultaneously through all of the phases with its magnitude in one phase being above the switch's trip level while its magnitude in a second phase is below the threshold level of the polarity detector. In such an event neither gate pulse generator for that second phase is disabled but the decoupling inductors provided therein ensure proper commutation.

The circuit details of polarity detector 17 are shown in FIG. 3. This detector is seen to comprise a pair of identical circuits. One circuit has its input coupled to the dotted end of the phase one secondary of transformer 13. The other circuit has its input coupled to the undotted end of that secondary.

The input from the dotted end of the secondary is fed via biasing resistors 21, 22 and 23 to the base of transistor 24. Capacitor 25 is provided as a noise suppressing filter. A polarity insuring diode 26 is connected between the base of transistor 24 and its grounded emitter. The collector of transistor 24 is connected via resistor 27 to the base of transistor 28. Resistor 29 is connected between base of transistor 28 and its emitter. The emitter of transistor 28 is also connected to a positive direct voltage point V. The collector of transistor 28 is connected to ground via resistor 30. The output of transistor 28 is fed from its collector, via resistor 31, as an input to gate pulse generator control circuit 18.

The input from the undotted end of the secondary is fed via biasing resistors 32, 33 and 34 to the base of transistor 35. Capacitor 36 is provided as a noise suppressing filter. A polarity insuring diode 37 is connected between the base of transistor 35 and its grounded emitter. The collector of transistor 35 is connected via resistor 38 to the base of transistor 39. Resistor 40 is connected between the base of transistor 39 and its emitter. The emitter of transistor 39 is connected to positive direct voltage point V. The collector of transistor 39 is connected to ground via resistor 41. The output of transistor 39 is fed from its collector, via resistor 42 as an input to gate pulse generator control circuit 18.

Gate pulse generator control circuit 18 comprises a pair of transistors 43 and 44. The base of transistor 43 is connected to resistor 42 of the polarity detector and the base of transistor 44 is connected to resistor 31 of the polarity detector. The emitters of both transistors 43 and 44 are connected to ground. The collector of transistor 43 is connected, via current limiting resistor 45, to the output of fast acting noise suppressing switch 16 while the collector of transistor 44 is also connected, via current limiting resistor 46 to the output of that switch. The collector of transistor 43 is connected to the input of gate pulse generator 19 while the collector of transistor 44 is connected to the input of gate pulse generator 20. Both of the gate pulse generators are operative to supply a trigger signal to their associated commutating thyristor upon receipt of a positive voltage Stop signal, but are unable to supply the trigger signal when their input is at ground potential.

The following is a detailed description of the operation of the circuitry shown in FIG. 3. For the sake of an example, it shall be assumed that a fault current begins to flow through leg 10 as soon as that leg begins conducting (when the dotted end of the phase one secondary of transformer 13 is positive). When the current flowing therethrough builds up to a predetermined magnitude the bias or conduction point of transistor 24 is reached. The bias point of transistor 24 is a function of the values of resistors 21, 22 and 23 and defines the threshold level below which detector 17 can not discriminate current direction. This threshold level is well below the trip level of the overcurrent detector 15. Once transistor 24 conducts, the emitter-to-base junction of transistor 28 becomes forward biased which turns that transistor on. When transistor 28 begins conducting its collector is raised from ground potential to the potential of positive voltage point V. This potential signal is fed via resistor 31 to the base of transistor 44.

At the time that the dotted end of the secondary is positive, transistor 35, coupled to the undotted end of the secondary, will be off since there is no forward bias for its base-to-emitter junction. When transistor 35 is off the emitter-to-base junction of transistor 39 is not forward biased and therefore that transistor will be off, with its collector at ground potential. Accordingly, the base of transistor 43 will be at ground potential.

Once the rectified signal from bridge 14 reaches the preselected trip level of circuit 15 the fast acting switch 16 supplies a positive voltage Stop signal X via resistors 45 and 46 to the collectors of the respective transistors 43 and 44.

Since the base of transistor 43 is at ground potential it is unable to conduct and the positive signal X is therefore directed as an input to pulse generator 19. Upon receipt of input voltage X generator 19 triggers commutating thyristor 10 into conduction. Transistor 44 on the other hand is rendered conductive by the positive potential provided to its base via resistor 31. Therefore, its collector will drop to ground potential and the positive stop signal will be shunted away from the input of gate pulse generator 20 thereby precluding it from triggering thyristor 10a. Once thyristor 10 is triggered into conduction and thyristor 10a is not, the energy stored in capacitor 11 is released in the reverse direction through conducting leg 8 to rapidly interrupt the fault current therein.

It is of course apparent from the above example that if the fault current were flowing through leg 8a, gate pulse generator 19 would be disabled while gate pulse generator 20 was enabled to ensure successful commutation of the power leg 8a.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim and desire to secure by Letters Patent of the United States is:

1. In a power system including a thyristor switch comprising a pair of power thyristors connected in inverse parallel relationship with one another, said thyristors being adapted to alternately conduct current between an alternating voltage source and a load, fault current detecting means for providing a "Stop" signal in response to the magnitude of current through said switch attaining a preselected level, and first and second triggerable commutation means respectively connected to said power thyristors, improved commutation control means comprising: first means operative when actuated for triggering said first commutation means, second means operative when actuated for triggering said second commutation means, both of said first and second triggering means being coupled to said fault current detecting means for actuation by said "Stop" signal, polarity detecting means coupled to said switch for determining which one of said power thyristors is conducting and for providing signals indicative thereof, and means connected to both of said triggering means and to the polarity detecting means and responsive to the signals from said polarity detecting means for selectively enabling the triggering means of the commutating means connected to the conducting power thyristor to be actuated by said "Stop" signal while disabling the other triggering means from being actuated, said last mentioned means comprising: first switch means coupled to the first triggering means and operative when conductive for directing the "Stop" signal away from the first triggering means; and second switch means coupled to the second triggering means and operative when conductive for directing the "Stop" signal away from said second triggering means.

2. The commutation control circuit as specified in claim 1 wherein said switch means are controllable in response to signals from said polarity detecting means.

3. The commutation control circuit as specified in claim 2 wherein said polarity detecting means is responsive to the direction of current in said switch only when the magnitude thereof exceeds a predetermined threshold level.

4. The commutation control circuit as specified in claim 3 wherein each of said first and second switch means is a transistor connected in shunt with said first and second triggering means, respectively.

5. In a power system including a thyristor switch comprising a pair of power thyristors connected in inverse parallel relationship with one another, said thyristors being adapted to alternately conduct current between an alternating voltage source and a load, current sensing means for monitoring the current flowing through the switch, fault current detecting means for providing a Stop signal in response to the magnitude of said current attaining a preselected level, a first commutation circuit connected in shunt with one of said power thyristor, a second commutation circuit connected in shunt with the other power thyristor, each commutation circuit comprising a d.c. charged commutating capacitor and a normally non-conductive commutating thyristor poled in the direction of the power thyristor shunted, improved commutation control means comprising: first trigger means operative when actuated for supplying a trigger signal to the commutating thyristor in shunt with the first power thyristor, second trigger means operative when actuated for supplying a trigger signal to the commutating thyristor in shunt with the other power thyristor, both of said first and second trigger means being coupled to said fault current detecting means for actuation by said "Stop" signal, polarity detecting means connected to said current sensing means for determining which power thyristor is conducting and for providing signals indicative thereof, and directing means connected to the polarity detecting means and responsive to the signals therefrom for directing the Stop signal to the trigger means of the commutating thyristor shunting the conducting thyristor while preventing other trigger means from receiving that signal, whereupon only the commutation circuit shunting the conducting thyristor is operative for interrupting the fault current, said directing means comprising first controllable switch means coupled to the first trigger means and operative when conductive for directing the "Stop" signal away from said first trigger means; and second controllable switch means coupled to the second trigger means and operative when conductive for directing the Stop signal away from said second trigger means.

6. The commutation control circuit as specified in claim 5 wherein said polarity detecting means is responsive to the direction of current in said switch only when the magnitude thereof exceeds a predetermined threshold level.

* * * * *